(12) United States Patent
Kennedy et al.

(10) Patent No.: US 9,800,837 B2
(45) Date of Patent: Oct. 24, 2017

(54) VIRTUAL CONTROL DEVICE

(75) Inventors: John T. Kennedy, Denver, CO (US);
David A. Kummer, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1589 days.

(21) Appl. No.: 12/347,722

(22) Filed: Dec. 31, 2008

(65) Prior Publication Data

US 2010/0169945 A1   Jul. 1, 2010

(51) Int. Cl.
*H04N 7/173*  (2011.01)
*H04N 7/16*  (2011.01)
*H04N 5/44*  (2011.01)
*H04N 21/41*  (2011.01)
*H04N 21/422*  (2011.01)
*H04N 5/445*  (2011.01)
*H04N 21/431*  (2011.01)
*H04N 21/47*  (2011.01)

(52) U.S. Cl.
CPC ........... *H04N 7/163* (2013.01); *H04N 5/4403* (2013.01); *H04N 21/4131* (2013.01); *H04N 21/42204* (2013.01); *H04N 21/4316* (2013.01); *H04N 21/47* (2013.01)

(58) Field of Classification Search
CPC .......... G04C 2201/30; H04N 21/42228; G08C 2201/21
USPC ........ 348/460, 552, 734, 725; 725/133, 110, 725/37; 341/176; 340/5.1
See application file for complete search history.

(56) References Cited

U.S. PATENT DOCUMENTS

| | | | |
|---|---|---|---|
| 4,903,307 A | 2/1990 | Ozawa et al. | |
| 5,550,644 A | 8/1996 | So | |
| 5,659,883 A | 8/1997 | Walker et al. | |
| 5,886,847 A | 3/1999 | Lee et al. | |
| 5,956,487 A * | 9/1999 | Venkatraman et al. | 709/218 |
| 5,982,445 A * | 11/1999 | Eyer et al. | 348/461 |
| 6,133,910 A | 10/2000 | Stinebruner | |
| 6,333,739 B1 * | 12/2001 | Koyama et al. | 715/744 |
| 6,628,344 B1 | 9/2003 | Weber | |
| 7,375,673 B2 * | 5/2008 | Spilo | 341/176 |
| 7,640,327 B2 * | 12/2009 | Humpleman et al. | 709/223 |

(Continued)

FOREIGN PATENT DOCUMENTS

WO   2006/042318 A2   4/2006

OTHER PUBLICATIONS

Dugan et al., "Automatic Reconfiguration Device," Preliminary Amendment dated Sep. 28, 2010, for U.S. Appl. No. 12/891,804, 10 pages.

(Continued)

*Primary Examiner* — Pankaj Kumar
*Assistant Examiner* — Reuben M Brown
(74) *Attorney, Agent, or Firm* — Seed IP Law Group LLP

(57) ABSTRACT

A method for controlling multiple devices using a virtual device that may be displayed on a screen. The method may include providing the information for the virtual device from a set-top box to the screen. The method may also include using a control device to scroll around the virtual device and make a selection fro the options provided by the virtual device. Additionally, the buttons on the control device may not correspond to the functionality associated with the virtual buttons on the virtual device.

12 Claims, 5 Drawing Sheets

(56) References Cited

U.S. PATENT DOCUMENTS

| | | | |
|---|---|---|---|
| 7,805,751 B1 | 9/2010 | Dugan et al. | |
| 7,886,318 B2* | 2/2011 | Wang et al. | 725/25 |
| 8,082,572 B1* | 12/2011 | Tilford | 725/133 |
| 2002/0057336 A1 | 5/2002 | Gaul et al. | |
| 2002/0174270 A1 | 11/2002 | Stecyk et al. | |
| 2004/0128402 A1 | 7/2004 | Weaver et al. | |
| 2006/0050142 A1* | 3/2006 | Scott et al. | 348/14.05 |
| 2006/0244839 A1* | 11/2006 | Glatron et al. | 348/211.11 |
| 2006/0253874 A1* | 11/2006 | Stark et al. | 725/62 |
| 2007/0118863 A1* | 5/2007 | Son et al. | 725/80 |
| 2007/0150924 A1* | 6/2007 | Ichinose et al. | 725/78 |
| 2007/0195195 A1 | 8/2007 | Hicks | |
| 2008/0141316 A1* | 6/2008 | Igoe et al. | 725/81 |
| 2008/0147371 A1* | 6/2008 | Gupton et al. | 703/14 |
| 2008/0225184 A1 | 9/2008 | Hardacker et al. | |
| 2009/0167855 A1* | 7/2009 | Kummer | 348/114 |
| 2009/0300620 A1 | 12/2009 | Park et al. | |
| 2010/0053462 A1* | 3/2010 | Candelore et al. | 348/734 |
| 2010/0146579 A1* | 6/2010 | Reams et al. | 725/131 |
| 2010/0169945 A1* | 7/2010 | Kennedy et al. | 725/110 |
| 2010/0251303 A1* | 9/2010 | Ellis et al. | 725/43 |
| 2010/0309389 A1* | 12/2010 | Hicks | 348/734 |
| 2011/0040856 A1 | 2/2011 | Dugan et al. | |
| 2012/0280803 A1* | 11/2012 | Sutardja | 340/12.23 |
| 2013/0208186 A1* | 8/2013 | Malone et al. | 348/563 |

OTHER PUBLICATIONS

Dugan et al., "Automatic Reconfiguration Device," Office Action mailed Mar. 4, 2011, for U.S. Appl. No. 12/891,804, 17 pages.

Dugan et al., "Automatic Reconfiguration Device," Amendment dated May 20, 2011, for U.S. Appl. No. 12/891,804, 13 pages.

Dugan et al., "Automatic Reconfiguration Device," Office Action mailed Aug. 29, 2011, for U.S. Appl. No. 12/891,804, 7 pages.

Dugan et al., "Automatic Reconfiguration Device," Response to Office Action dated Nov. 28, 2011, for U.S. Appl. No. 12/891,804, 5 pages.

Dugan et al., "Automatic Reconfiguration Device," Office Action mailed May 28, 2008, for U.S. Appl. No. 11/117,819, 27 pages.

Dugan et al., "Automatic Reconfiguration Device," Response to Office Action dated Sep. 26, 2008, for U.S. Appl. No. 11/117,819, 18 pages.

Dugan et al., "Automatic Reconfiguration Device," Office Action mailed Jan. 9, 2009, for U.S. Appl. No. 11/117,819, 32 pages.

Dugan et al., "Automatic Reconfiguration Device," Response to Office Action dated Apr. 3, 2009, for U.S. Appl. No. 11/117,819, 12 pages.

Dugan et al., "Automatic Reconfiguration Device," Office Action mailed Jun. 8, 2009, for U.S. Appl. No. 11/117,819, 17 pages.

Dugan et al., "Automatic Reconfiguration Device," Response to Office Action dated Sep. 3, 2009, for U.S. Appl. No. 11/117,819, 12 pages.

Dugan et al., "Automatic Reconfiguration Device," Office Action mailed Dec. 22, 2009, for U.S. Appl. No. 11/117,819, 16 pages.

Dugan et al., "Automatic Reconfiguration Device," Response to Office Action dated Feb. 19, 2010, for U.S. Appl. No. 11/117,819, 12 pages.

Dugan et al., "Automatic Reconfiguration Device," Appeal Brief dated Apr. 19, 2010, for U.S. Appl. No. 11/117,819, 21 pages.

Dugan et al., "Automatic Reconfiguration Device," Notice of Allowance mailed Jul. 16, 2010, for U.S. Appl. No. 11/117,819, 4 pages.

International Search Report and Written Opinion for International Application No. PCT/US2009/066998, dated Feb. 25, 2010, 15 pages.

* cited by examiner

VIRTUAL CONTROL DEVICE

FIELD OF THE INVENTION

The present invention generally relates to control devices and, more specifically, to a set-top box or other single electronic component that may control multiple components via a virtual device.

BACKGROUND

Many households include multiple components such as televisions, sound systems, digital video disc ("DVD") players, lighting systems, security systems and so on that may be controlled by corresponding remote controls. For example, a television may have a corresponding remote control, a sound system may have a second remote control, and a DVD player may be controlled by yet another remote control. Accordingly, three remote controls may be used or needed to watch a movie on the television using the DVD player and the sound system.

Presently, one universal remote control may be programmed to control multiple components. Various buttons of the remote may be programmed to control various devices or perform various functions. Thus, one button on the universal remote control may correspond to and provide certain functions for the multiple associated devices. The burden may then be on the user to remember which button on the remote control is associated with which device and which function. Furthermore, replacing the programmed remote control may require the user to re-program each of the buttons of a new remote control to access each of the components the user desires to control. Accordingly, there is a need in the art for an improved control device.

SUMMARY

One embodiment of the present invention takes the form of a method for controlling a plurality of components. The method includes displaying a virtual device on a display. The virtual device may comprise at least one selectable option which may be associated with control information for at least one of the plurality of components. The method may also include monitoring the virtual device for a remote indication that an option has been selected from the at least one selectable option. Another aspect of the method includes determining the control information for a target component associated with the selected option upon receiving an indication that an option is selected. Additionally, the control information may be included in a control command for the target component. The method may also include transmitting the control command to the target component. Furthermore, the method may also include communicating the display information for the virtual device form the set-top box to the virtual device.

The method may also include wirelessly transmitting the control command from the set-top box where the control command may comprise a first instruction and a second instruction, where the first instruction may activate a function of the component and the second instruction may activate a second function of a second component. The method may also include downloading the control information for the plurality of components onto a set-top box from one storage device. Furthermore, the method may include providing the selectable options for the virtual device for viewing at a remote location, where the at least one selectable options for the virtual device may be provided by a first device. Additionally, the method may include using a control device at least to select an option displayed on the virtual device where the control device may transmit control information provided by the first device. The first device may be a set-top box.

Another embodiment of the present invention takes the form of a remote device system. In this embodiment, the remote device system may include a set-top box configured to provide information for displaying a virtual device and a control device configured to select an option from the virtual device on the monitor via a selection mechanism. Further, the set-top box may be configured to transmit a command in response to selection of an option from the virtual device and may be further configured to control at least one component by transmitting a first signal. The control device may also include scrolling inputs that may allow navigation of the virtual device.

Still another embodiment of the present invention takes the form of a method for controlling a plurality of components. The method may include storing, on a first device, control information corresponding to the plurality of components, providing selectable options on a display, wherein the control information for displaying the options may be provided by the first device, receiving an indication of a selected option from a second device and displaying the selectable options on the display, wherein the information for displaying the virtual device may be provided by the first device. The method may also include communicating the display information for the virtual device from the first device to the virtual device. Additionally, the control information may be wirelessly transmitted from the set-top box to a target component of the plurality of components. Further, the control information may comprise a first instruction and a second instruction where the first instruction may activate a function of the component and the second instruction may activate a second function of a second component. The control information may be downloaded onto the first device from one storage device The method may include transmitting a first signal from a set-top box to a control device, where the first signal may include at least the control command information for a component and transmitting a second signal from the control device to the component, where the second signal may include at least the control command information for the component. Further, the first signal may be a radio frequency signal. The method may also include a transmitting a first signal from a set-top box to a control device where the control device may erase the control command information after transmitting the second signal.

Yet another embodiment of the present invention takes the form of a method for controlling a plurality of components. The method may include receiving an input command, determining the component associated with the input command, switching to a first control mode for the component associated with the input command, transmitting a first control command to turn the component on, transmitting a second control command to the component so that the component may be configured to receive a satellite signal and switching to a second control mode for communicating with a satellite receiver. The method may also include receiving control information for the second control command from a set-top box where the control information may be downloaded onto a set-top box from one storage device. Additionally, the second control mode may be the default control mode. Furthermore, configuring the component to receive the satellite signal may comprise changing the channel of the component.

These and other advantages and features of the present invention will become apparent to those of ordinary skill in the art upon reading this disclosure in its entirety.

BRIEF DESCRIPTION OF THE DRAWINGS

FIG. 3 depicts multiple devices and communication there between.

DETAILED DESCRIPTION OF EMBODIMENTS

I. Overview

Figure 1:
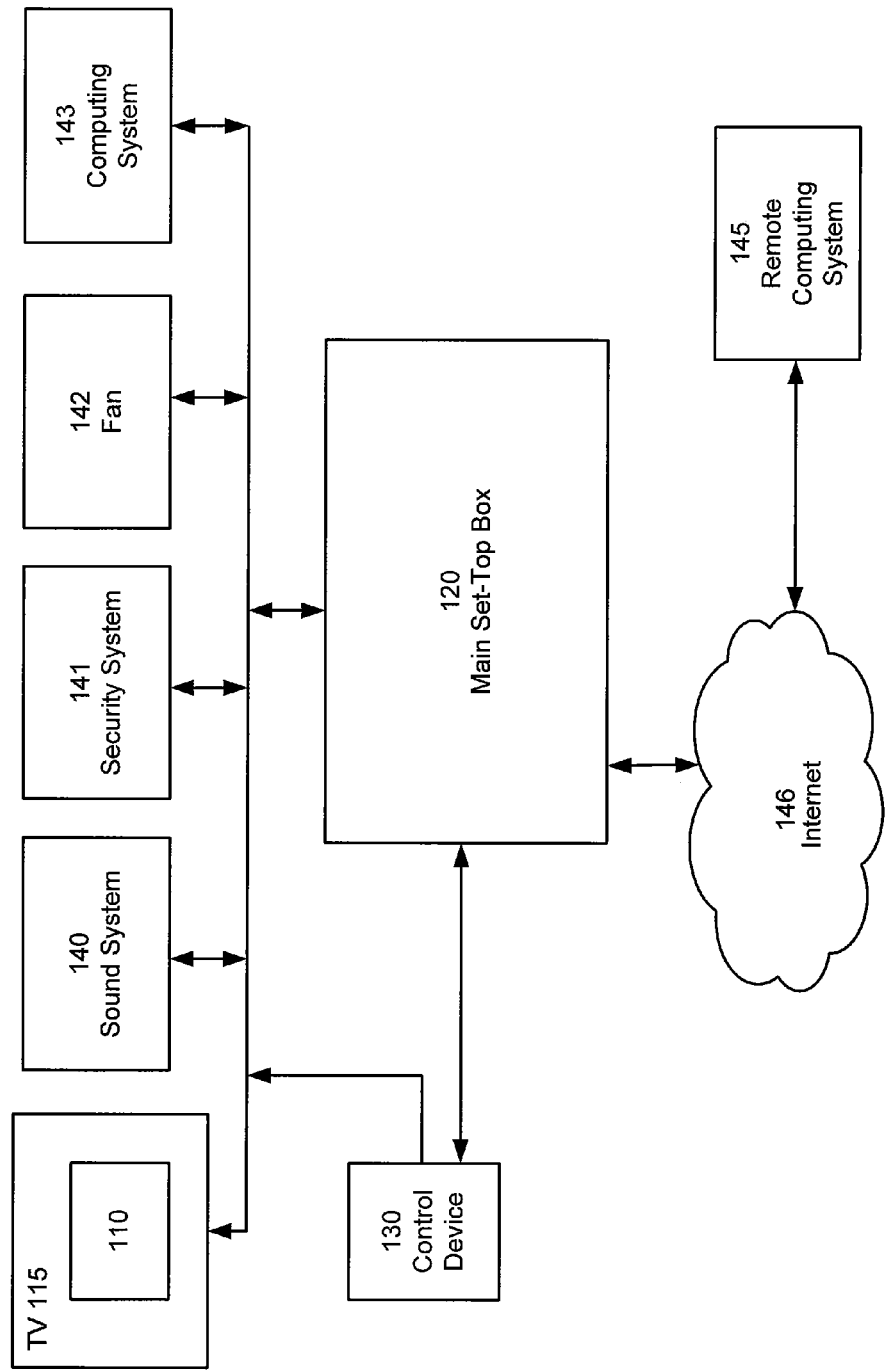
FIG. 1 depicts a sample operating environment 100 for a virtual remote.

Generally, one embodiment disclosed herein may take the form of a method for controlling one or more electronic components from a set-top box or other electronic device. In this embodiment, information, including information for controlling various electronic components, may be downloaded from a number of sources onto the set-top box. The information may be downloaded onto the set-top box wirelessly, through an Internet protocol ("IP") connection, through a satellite signal and so on. The set-top box may control one or more electronic components by communicating such information directly to the components. Such information may be transmitted from the set-top box to the components wirelessly, for example, by an infrared or radio frequency signal. Further, the set-top box may facilitate implementing a virtual device to facilitate the user selecting a control command function for various devices.

Another embodiment disclosed herein may take the form of a method for controlling one or more components through a virtual device. In this embodiment, a screen may display the virtual device and a set-top box may provide the information for displaying the virtual device. The displayed information may be downloaded onto the set-top box, for example, from an electronic component remote control, the electronic component itself, a website and so on, and may include commands to control functionality of various other components. Accordingly, the virtual device may include selectable options that correspond to, or when selected, execute control functions of other components. Accordingly, the user may control the components by manipulating the virtual device, for example, by selecting an option from the virtual device using a control device. The control device may include control functionality (such as buttons, a ball, wheel and so on) permitting navigation through the options of the virtual device. Thus, the control device may have a simplified layout or a reduced functionality set when compared to the virtual device. For example, the control device may be limited to navigational control(s) and a selection button, thereby permitting a user to navigate the virtual device and select a virtual control to activate the desired functionality of an electronic component or components.

Yet another embodiment may take the form of a method for communicating control information from a control device to an electrical component. The control device may receive information for the target electronic component from the set-top box. Such information may include, but is not limited to, infrared codes and/or signals for controlling the target electrical component. In one example of this embodiment, the method may allow a user to control any electrical component that may be within range of the control device. The control device may control the target electronic component even though the target electrical component may not be in the line of sight of the set-top box.

Continuing the example, a user may view the virtual remote and may select an option from the virtual remote, such as changing the channel on the target electrical component. The virtual remote may display a list of options that may appear on any type of screen including a computer monitor, a cell phone display, a personal digital assistant display ("PDA") and so on. The set-top box may receive the user selection from the virtual remote and may communicate control information to the control device. The control device may then use the information to wirelessly control the target component. Alternatively, control may occur through a wired connection. The target component need not be in the line of sight of the set-top box so long as it can receive the command.

It should be noted that embodiments of the present invention may be used in a variety of systems that may include components that may be controlled by a remote device. The embodiment may include or work with a variety of electrical components, communication devices, remote devices and set-top boxes. Aspects of the present invention may be used with practically any apparatus related to remotely controllable electrical components. Accordingly, embodiments of the present invention may be employed in any type of system where at least some of the components may be controlled by a remote device.

It should be understood that the invention is not limited in its application to the details of the particular arrangements shown, because the invention is capable of other arrangements. Also, the terminology used herein is for the purpose of description and not of limitation.

II. Operating Environment

FIG. 1 depicts one embodiment of an environment 100 in which a user may employ and/or view the virtual device 110. Various components may be located in the environment 100 of FIG. 1 such as, but not limited to, a television 115, a set-top box 120 and a control device 130. The set-top box 120 may contain information for individual components that may be communicated from the set-top box 120 to the individual components of the environment 100. The type of information and the operations of loading the information onto the set-top box 120 will be discussed in further detail below.

A set-top box 120, which generally may be a television receiving device 120, may be located in the environment 100 of FIG. 1. The set-top box 120 may include various functionalities, including but not limited to, digital video recorder ("DVR") functionality, infrared ("IR") blaster functionality, wireless, radio frequency ("RF") transmission capability and so on. The set-top box 120 may be connected to a cable television distributor, antenna that can receive broadcast signals from a broadcast television provider, satellite communication device, control device 130, phone line connection, and one or more peripheral electronic devices that may include a television 115. The phone line can be used by the set-top box 120 to communicate with one or more outside entities or systems. These communications may include requesting pay-per-view programming, obtaining updates to subscriber programming, and/or receiving updates to software on the set-top box 120. One skilled in the art will recognize that there are many other uses for this phone line connection. Further, the communication between the control device 130 and the set-top box 120 may be via the Internet, intranet, LAN, WAN, WIFI, wireless, coaxial cables, CAT 5 cabling, fiber optic connections and so on.

Generally, the set-top box 120 may receive television signals from a cable television distributor, a broadcast television provider, or satellite television distributor. The set-top box 120 may process those television signals and may send the processed signals to peripheral electronic components. The set-top box 120 also may accept commands from a control device 130. More detail about the functionality of the set-top box 120 is provided below.

A control device 130 may operate in the environment 100. The control device 130 may be alternatively referred to herein as a "remote control" or a "remote." The control device 130 may be a cell phone, a track pad incorporated into a computing system, a dedicated device for controlling the set-top box 120 and so on. The control device 130 may communicate with the set-top box 120 through a wired or a wireless connection. The wireless connection may be an IR signal, RF signal, wireless Internet Protocol ("IP") connection, cellular, WiMax, satellite signal, combinations thereof or otherwise. The control device 130 need not be in the line of sight of the set-top box 120 and may be located anywhere that permits communication with the set-top box. In addition to sending commands to the set-top box 120, the control device 130 may send signals to other peripheral electronic devices that form part of the environment 100 such as the television, a stereo, a VCR, a DVD player and so on. The control device 130 may include buttons, dials, or other man-machine interfaces.

The components located in the environment 100 of FIG. 1 are provided for explanatory purposes only. Also, any number and type of component may be located in the environment 100 such as, but not limited to, a sound system 140, a security system 141, a fan 142 and so on. Further, a computing system 143 may be located in the environment 100 as depicted in FIG. 1. The computing system 143 may be in the same room or may be in a different room than the set-top box 120 and may communicate to the set-top box through a network. A remote computing system 145 may also be located in the environment 100 and may communicate to the set-top box 120 via the Internet 146 or other communications mediums such as wireless or otherwise. The set-top box 120 may be connected to one or more of the peripheral electronic components. These components may receive signals from the set-top box or send signals to the set-top box. For instance, the television 115 may receive video and/or audio signals. The stereo may receive only audio signals. A camcorder (not shown), on the other hand, may send video or audio signals to the set-top box 120. The peripheral components may include any type of commercially available electronic component.

Although FIG. 1 depicts only one television 115, multiple televisions may be located in the environment 100 and may all be located in one room, one or more additional televisions that may be located in one or more other rooms or any combination thereof. It is also possible that other components may be located in separate rooms from one another. For example, a fan 142 may be located in the same room as the set-top box 120, while the security system 141 may be located in an entirely separate room. Even though the fan 142 and the security system 141 may be located in different rooms, it is still possible for the control device 130 to communicate to either and/or both of the components as long as the components are within receiving range of the signal from the control device 130.

III. Communications and Connections

In FIG. 1, the set-top box 120 may be operationally, directly, indirectly, functionally or otherwise connected to the television 115. Communications between the television 115 and the set-top box 120 may be unidirectional or bidirectional, where bidirectional communications are provided by the television display, and may be provided through various interfaces such as a high definition multimedia interface ("HDMI") cable, a co-axial cable, structured cable, Ethernet, wirelessly, combinations thereof and so on. The television 115 may receive a signal from the set-top box 120, through the interface, to display the virtual device 110 on the screen so that the user may view the available options provided by the virtual device 110 and interact therewith. The virtual device 110 will be discussed in further detail below.

The set-top box 120 may control the components of environment 100 wirelessly, through a wired connection, or through a combination thereof. The set-top box 120 may also control the components resident in environment 100 through a control device 130, which will be discussed in further detail below. For example in FIG. 1, the set-top box 120 may communicate with the television 115 and the control device 130. The set-top box 120 may communicate with the television 115 and/or the control device 130 through any type of interface as previously discussed; such communication may be wired or wireless, across a network or local. Furthermore, the communication between the set-top box 120 and the control device 130 is generally wireless, although it may be possible to communicate between the set-top box and the control device by establishing a wired connection between the two components. Moreover, it may be possible for the set-top box 120 to communicate with the television 115 and the control device 130 through any combination of wired and wireless connections.

In FIG. 1, information for each individual component may be downloaded onto the set-top box 120. The information may be downloaded via a satellite signal, an Internet connection, a cable connection, a wireless connection, combinations of the foregoing, and so on. A set-top box is used herein for explanatory purposes. Generally, information may be downloaded onto various components such as a television, a computing system and so on. The control information corresponding to each component, links between a virtual button 111 (FIG. 2) and the virtual device 110 and so on may be provided to the set-top box 120 in various ways. The control information for each component and its corresponding virtual may be stored in various ways including a look-up table. (The look-up table will be discussed in further detail below.) For example, the control information may be stored in the memory of the set-top box 120, downloaded via a network as needed, or sent from the individual component or component's remote control device to the set-top box 120 through a wired or wireless connection. Further, the information may be provided to the set-top box 120 by loading the information from a portable memory, such as a flash drive, onto the set-top box 120. The information may also be provided by an individual component to the set-top box 120 through an input such as an HDMI input. Moreover, the information stored on the set-top box 120 may be initially stored on a local, remote or distal server, thus allowing a user to download the information from the server instead of manually transferring the control information for each component, one component at a time, in groupings thereof, or in bulk.

The control commands may include particular electromagnetic wavelengths (or modulations thereof) that may be recognized and/or acknowledged by the corresponding electrical component. The control commands may also or alternatively include unique data formats, encryption schemes or the like that are associated with and recognized by the device to be controlled. Further, information and/or commands for multiple electronic components may be downloaded onto the set-top box 120, thereby permitting the virtual device to mimic multiple remote controls separately or simultaneously. In another example, the security system 141, the fan 142 and the sound system 140 may all have individual dedicated remote controls. Commands corresponding to functionality of each of the remote controls of the security system 141, the fan 142 and the sound system 140 may all be downloaded onto the set-top box 120 and incorporated into the virtual device 110.

In FIG. 1, the virtual device 110 may also control the components of environment 100 by relaying information through the control device 130. The set-top box 120 may provide the information to the control device 130 for transmission to a component. The components of environment 100 may be in wireless communication with the control device 130 such that the control device may relay commands from the set-top box 120 to the electrical components using, for example, an infrared or radio frequency signal. Additionally, the television 115 may also be in communication with and/or be controlled by the control device 130 directly or through the virtual device 110. In one example, the control device 130 may communicate directly with the television 115 to turn the television on. In another example, a user may use the control device 130 to select an option from the virtual device 110 and the selected option may be communicated to the television 115 via a relayed or direct command from the set-top box 120.

Although the control device 130 may be in communication with the television 115, the control device 130 need not physically interface with the television 115. For example, the control device 130 may communicate with the television 115 through infrared signals. The control device 130 may select commands to be communicated commands to the television 115 via the virtual device 110 such as changing the channel of the television 115, adjusting the volume and so on. Further, the control device 130 may allow a user to select an option from the virtual device 110, thus, controlling one or multiple components. The control device 130 may also communicate control commands to electrical components that are in receiving range of a signal from the control device 130 or in the line of sight of the control device 130.

The control device 130 of FIG. 1 may include selection buttons that correspond to and directly control individual components. For example, the control device 130 may include multiple selection buttons, where individual buttons may correspond, on a one-to-one basis, to individual televisions located in different rooms. Continuing the example, a first button may control a first television in a first room and a second button may control a second television in a second room. The first button may allow the user to turn the power on for the first television when the control device 130 is in range of the first television. Similarly, the second button may allow the user to turn the second television on when the control device 130 is in the second room or in receiving range of the second television. The functionality of the control device 130 buttons will be discussed in further detail below.

As shown in FIG. 1, the control device 130 may communicate with the set-top box 120, which in turn may communicate with the television 115. The control device 130 may send and receive signals to and from the set-top box 120. In one example, the control device 130 may send control commands as infrared signals to the set-top box 120 when selecting an option from, or otherwise interacting with, the virtual device 110 displayed on the screen of the television 115. For example, the control device 130 may include buttons that allow the user to scroll around the virtual device 110. Continuing the example, the control device 130 may include up, down, left and right buttons. The four buttons may allow the user to scroll to the desired selection on the virtual device 110 on the screen of the television 115. Thus, if the user would like to go to a selection that may be located on the screen beneath the currently selected box, the user may use the down button to move down to the desired selection.

The control device 130 need not have buttons and may be any type of device that allows the user to navigate around the virtual device 110. In another example, the control device 130 may be a handheld device incorporating a touch pad and/or track wheel/ball, thereby permitting the user to view the virtual device on the monitor of the computing touch pad or associated screen. The touch pad or track wheel/ball may allow the user to navigate to the desired option from the virtual device 110 and also may allow the user to select the desired option.

Additionally, the virtual device 110 may be viewed on the television 115 or any other television or monitor that may be in communication with the set-top box 120. For example, the control commands for sound system 140 may be downloaded onto the set-top box 120 and one or more screen images corresponding to each control command may be displayed on the television 115 as part of the virtual device. The televisions and/or monitors need not be in the same room as the set-top box 120 and need not be line of sight with the set-top box. The virtual device 110 may be provided to the component for viewing from the set-top box 120 through an IP connection, through a satellite signal and so on. The information for the virtual device 110 may be provided by the set-top box 120 to the component for viewing. For example, the virtual device 110 may be viewed on the computing system 143 monitor that may be in the same room as the set-top box 120, a monitor of the remote computing system 145, a cell phone screen, a personal digital assistant display or any other device that may be in communication with the set-top box 120 through any type of connection or protocol including wired, IP connections, infrared signals, radio frequency signals, combinations of the foregoing, and so on. The virtual device 110 will be discussed in further detail below.

V. The Virtual Device

Figure 2:
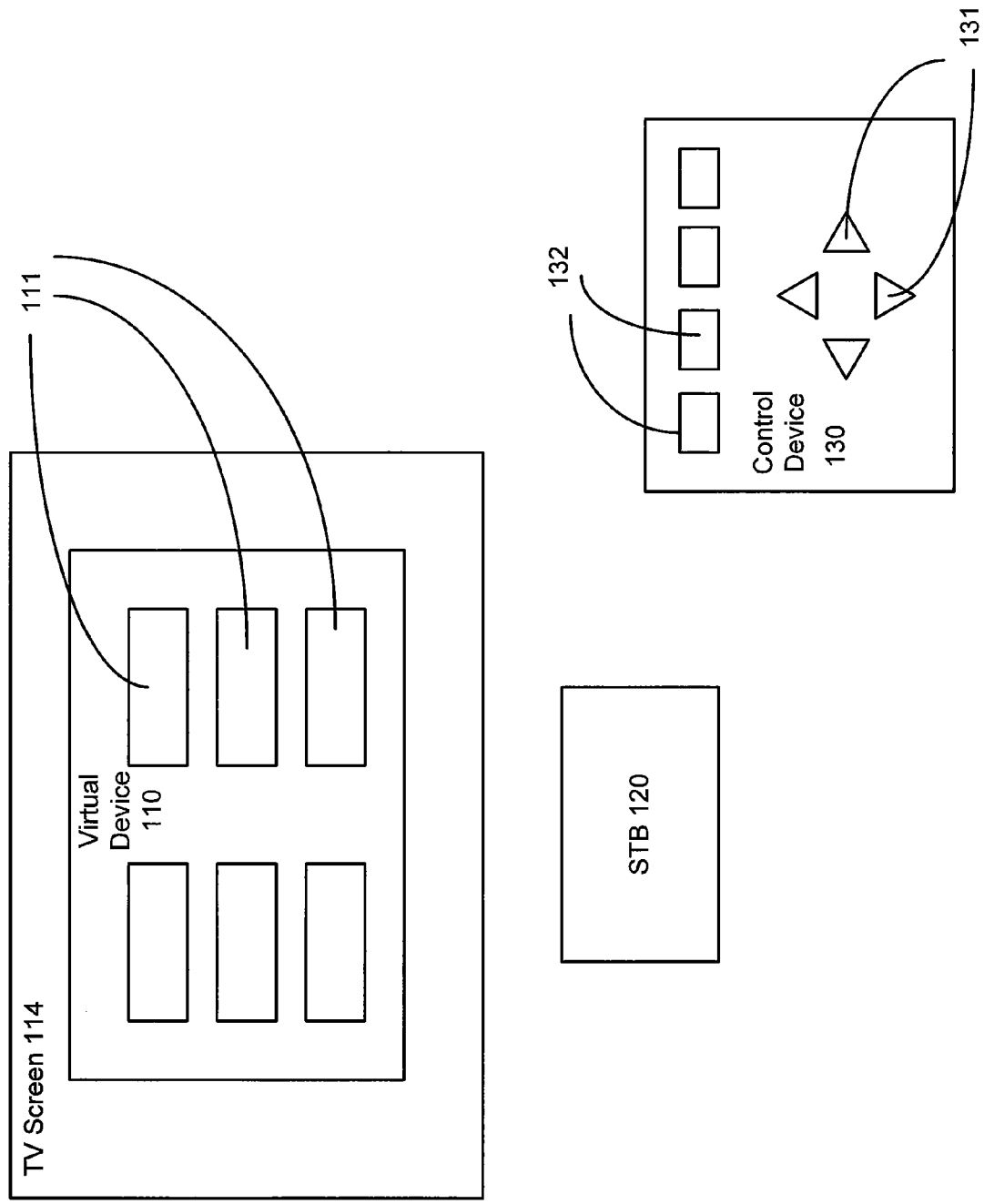
FIG. 2 depicts one embodiment of a virtual remote and a control device.

FIG. 2 depicts one embodiment of a virtual device 110 and a control device 130. The virtual device 110 may be displayed on a screen 114 of a television, and is referred to herein as an "overlay" 110. The terms virtual device or overlay are generally used interchangeably. The virtual device 110 may provide a remotely located user, with the ability to control any component that may be controlled with a remote control such as a television, stereo, game system, DVD player, fan or lighting system, security system and so on, or any combination thereof.

As shown in FIG. 2, the virtual device 110 may display options or "virtual buttons" 111. The layout of the virtual buttons 111 is an example as the virtual device 110 may include any number of virtual buttons 111 arranged in any order. Layered windows and other visual options may also be used to provide the virtual device 110. The appearance of the options 111 or virtual buttons 111 may also take any form, such as rectangular buttons (as shown in FIG. 2), a text list of options, pictures and so on.

The virtual buttons 111 may be selected by maneuvering a cursor over the desired virtual button 111 via the control device 130, by highlighting the virtual button 111, or any other way that allows the user to identify and/or select the desired virtual button 111. By selecting a specific virtual button 111 on the set-top box 120, a corresponding infrared command may be executed to control the associated component. In response to the user selecting a specific virtual button 111, the set-top box 120 may process the command and determine the target electronic component, to which the command corresponds. The set-top box 120 may use a look-up table such as an associative array to determine which electronic component corresponds to the command and then send the command over a network to the target electronic component to be controlled and the target component for execution. The command may be associated with the corresponding virtual button 111 via a hidden link between the virtual button 111 and the look-up table, which may be stored in a memory or other storage of the set-top box 120.

As an example, the sound system 140 of FIG. 1 may include THX functionality that may be represented by the upper left virtual button 111 in FIG. 2. Selecting the upper left virtual button 111 of FIG. 2 may initiate transmission of an infrared code that may be stored in the look-up table in the memory of the set-top box 120. The look-up table may contain information that allows the set-top box 120 to determine which commands are associated with which electronic components. For example, the look-up table may include an array of commands where each command is associated with a specific electronic component and control command information for the specific electronic component.

In some embodiments, the virtual buttons 111 of FIG. 2 may not change in appearance on the virtual device 110 from one screen of the virtual device 110 to the next screen. However, the functionality associated with the virtual buttons 111 may change depending on the window selected by a user. For example, the virtual device 110 may include a grid of virtual buttons 111 where each of the virtual buttons 111 may be associated with individual components. The user may select a virtual button associated with a sound system. After the user makes the selection, the virtual buttons 111 as they appear on the screen may be the same, but possibly re-labeled. However, the virtual button previously associated with the sound system may now be associated with a different functionality, such as volume. Thus, although the virtual buttons 111 may appear the same on the virtual device 110, the functionality associated with the virtual buttons may depend on the current window selected.

As shown in FIG. 2, the control device 130 may include certain assigned buttons 132. The term "assigned" generally indicates that certain buttons of the control device 130 may correspond to individual televisions. For example, the assigned buttons 132 of the control device 130 may be programmed to correspond to and control at least some functions of a specific, individual television, such as a remote television located in a separate room from the set-top box. Generally, programming an assigned button 132 of the control device may include associating the infrared code for controlling a television or monitor with the assigned button 132 of the control device. Additionally, the control device 130 may be configured such that one of the buttons 132 may turn on the remote television.

The scrolling inputs 131 of the control device 130 may allow the user to move a cursor or selector around the virtual device 120 appearing on the screen of a television. Further, the scrolling inputs 131 may allow the user to interact with the virtual device 120 regardless of which television or monitor displays the virtual device. Since the scrolling inputs move a cursor, they may not be directly associated with the functionality of the virtual buttons 111 that are displayed by the virtual device 110. For example, the cursor may be on the top left virtual button 111 and the user may desire to select the bottom right virtual button. The user may push the right arrow scrolling button of the scrolling inputs 131 once and the down arrow scrolling button of the scrolling buttons 131 twice so that the cursor appears over the bottom right virtual button. The bottom right virtual button 111 may appear highlighted or distinct in some way from the other virtual buttons 131, so that the user may be able to identify which virtual button the user has selected.

VI. Repeating Signals and Extended Operations

Returning to FIG. 1, in at least one embodiment, the control device 130 may function as a signal repeater. In such an embodiment, the set-top box 120 may receive a request to communicate to and/or to control another component, such as the sound system 140, from the control device 130. After the set-top box 120 receives the request, the set-top box 120 may wirelessly communicate the corresponding command by radio frequency and/or infrared signal to the control device 130. The information sent by the set-top box 120 to the control device 130 may include, among other things, the information that the control device 130 may need to communicate to the sound system 140. The control device 130 functioning as a signal repeater will be discussed in further detail below.

Continuing this example, different signals may be transmitted between the components. Further, the signals may be different wavelengths, encoded differently, modulated differently and so on. In this example, the first signal may be a radio frequency signal and may be transmitted between the set-top box 120 and the control device 130 and the second signal may be an infrared signal and may be transmitted between the control device and the sound system 140.

Continuing the embodiment where the control device 130 of FIG. 1 may function as a signal repeater, a user may wish to control the sound system 140, but the user may be remotely located from the sound system 140. The set-top box 120 may not be able to communicate with the sound system 140 because the sound system 140 may be located in a separate room from the set-top box 120. However the control device may be located in the line of sight of the sound system 140. In such a case, the set-top box 120 may send a signal to the control device 130 so that the control device may communicate directly with the sound system 140. For example, a user may be located in a remote location such as a different building and may view the virtual device via an IP connection to the set-top box 120. The virtual device will be discussed in further detail below. The user may select an option from the virtual device such as change the sound system volume. The set-top box 120 may receive the selection made by the user and communicate a signal to the control device 130. The control device 130 may then communicate the command to the sound system 140.

Further, the set-top box 120, the control device 130 and the components of FIG. 1 may be located in different buildings or rooms. For example, the set-top box 120 may be located in building A and the control device 130 may be located in building B, room 2, while the target electronic component may be located in building B, room 1. The set-top box 120 and the control device 130 may be connected by a network connection such as a LAN while an additional network between the buildings may connect the set-top box 120 to the target electronic component. Further, in this example, a person may be in building B, room 2 with a second electronic component. The second electronic component may allow the user to view a virtual device 110 and may be any type of electronic component with a screen such as a television, computer monitor, cell phone and so on. The user may view the virtual device 110 on the second electronic component and may use the virtual device to control the target electronic component located in building B, room 1. Continuing this example, the target electronic component may receive the control signal across the network from the set-top box 120, which may be located in a different building. Additionally, the user may control the target electronic component by sending a control signal via a network that may connect the target electronic component with the set-top box 120.

Figure 3:
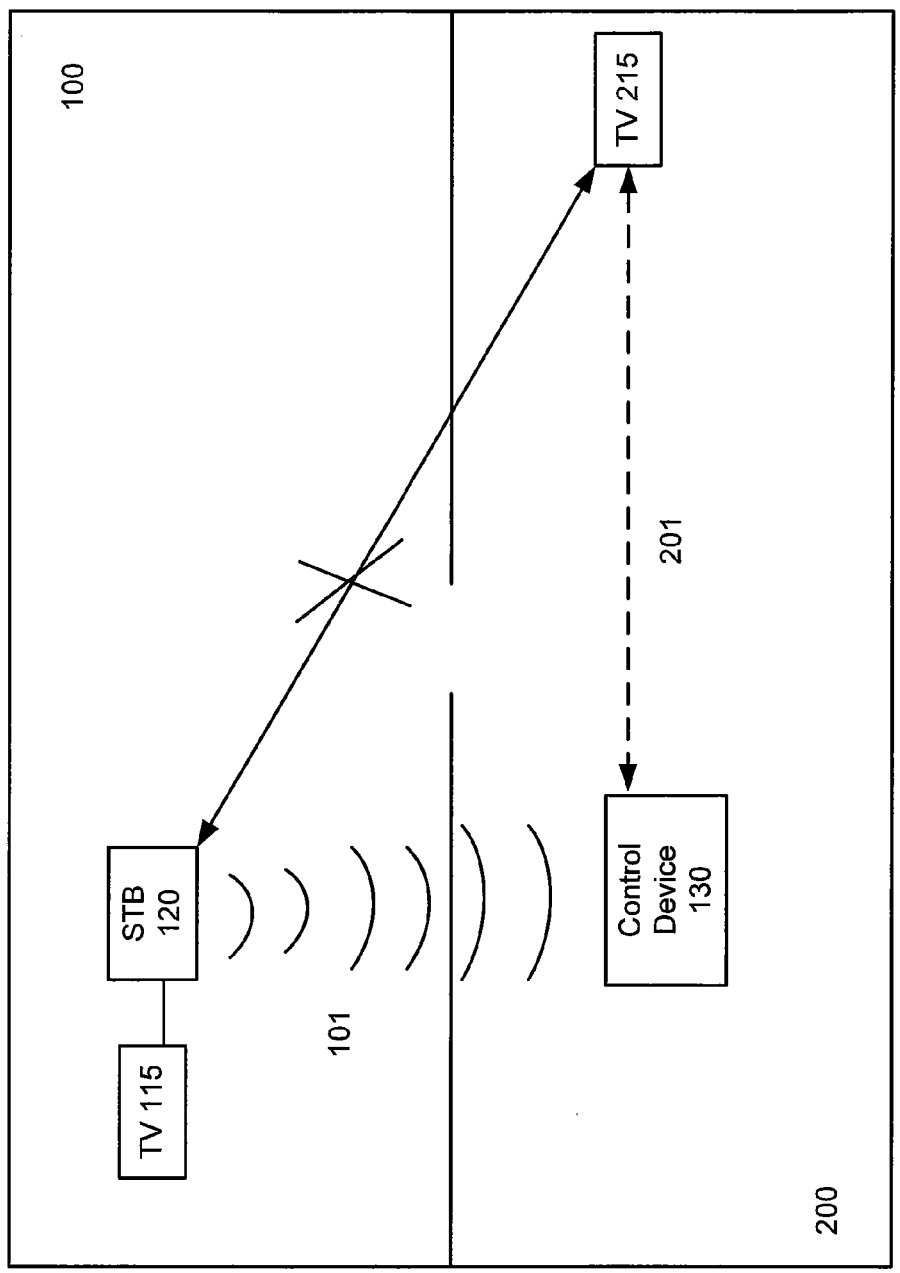

FIG. 3 depicts another embodiment, which may operate in environment 100 as well as in another room, referred to herein as "room two" for explanatory purposes. Room two may include a television 215. In room two, a user may wish to control the television 215 and other electronic devices via the virtual device 110, which may be shown on the television 215. (An additional set-top box need not be employed to communicate with the target component even though the target component may be in a separate room than the set-top box.) In this embodiment, the control device 130 may function as a repeater. The television 215 may not be controlled by the set-top box 120 through infrared signals in environment 100 because the television 215 may not be in the line of sight of the set-top box 120. For example, a direct infrared signal may not reach television 210 as indicated in FIG. 3 with an "X". For example, the user may turn on the television 215 using one of the assigned buttons 132 (as shown in FIG. 2) on the control device 130. The assigned button 132 may cause the virtual device 110 to be displayed on the screen of the television two 215 as well as turn on the television 215. The set-top box 120 may send a radio frequency signal 101 to the control device 130 that may allow the control device 130 to communicate through infrared signals 201 to the television 215. The radio frequency signal sent by the set-top box 120 to the control device 130 may include information such as the infrared code for control device 130 to control the television 215.

In one embodiment, the control device 130 may also function in a default mode in order to conserve battery power of the control device. The default mode of the control device 130 may only permit the control device to send and/or receive infrared signals, for example, to control a component, but not send or receive radio frequency signals. The control device 130 may function in a relay or repeater mode when the set-top box instructs it to do so. The control device 130 may return to the default mode after receipt of the set-top box signal and after repeating the control information transmitted by the set-top box as an infrared signal to the target component.

As in yet another aspect of an embodiment, a target component may be initialized so that it may receive a satellite signal. The target component may be located in a separate room from the set-top box that contains the information for communicating with the target component. A user may initialize the target component using a control device, optionally via a dedicated button. For example, the control device may have a button that may correspond to a television in the master bedroom, which when pressed, may turn the television on, as well as instructing the set-top box to show the virtual remote on the television screen.

Additionally, the control device may communicate with the target component employing the information sent by the set-top box. In one embodiment, the control device may receive information from the set-top box that includes, but is not limited to, an infrared command for controlling the target component. The information received by the control device may also include the signal format that may be used to control the target component. The control device may function as an infrared repeater and repeat the infrared command in order to control the target component. In this embodiment, the need for infrared blaster cables may be eliminated. After the control device repeats the infrared command to the target component, the control device may return to a set-top box control status. The set-top box control status may be a default status for the control device and may allow the control device to communicate with the set-top box as needed.

Figure 4:
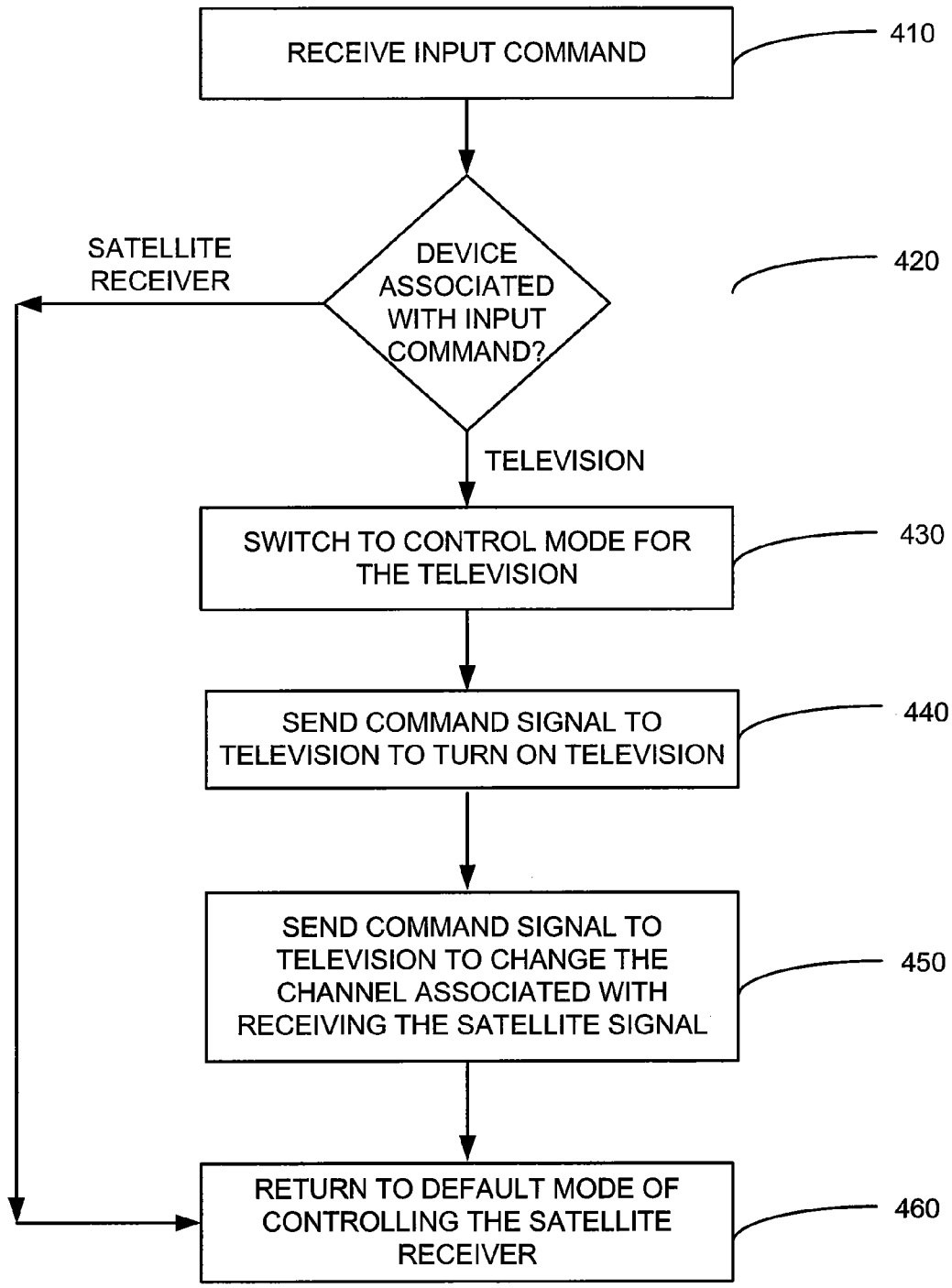
FIG. 4 is a flowchart depicting a method to change the settings of a component.

As depicted in the flowchart of FIG. 4, the method 400 includes setting a television to a default mode so that the television may receive a satellite signal. In the operation of block 410, a control device may receive a command input. The command input may be a user selecting any button, such as, but not limited to, a "TV" button. In the operation of block 420, the control device or set-top box may determine which device is associated with the received input command. After the user selects the "TV" button, the control device may switch to a mode associated with controlling the television in the operation of block 430. The control device may already be in the mode associated with controlling the television and thus, may not need to switch in this case. The control device may then send a command signal to the television to turn the television on in the operation of block 440. In the operation of block 450, the control device may send a command signal to the television and changing the channel to the channel associated with the satellite signal. In the operation of block 460, the control device may return to a default mode of controlling the satellite receiver. In one embodiment, even though the television may be on channel that does not receive the satellite signal, once the user selects the "TV" button, the television will be turned on and tuned to the channel that does receive the satellite signal.

Figure 5:
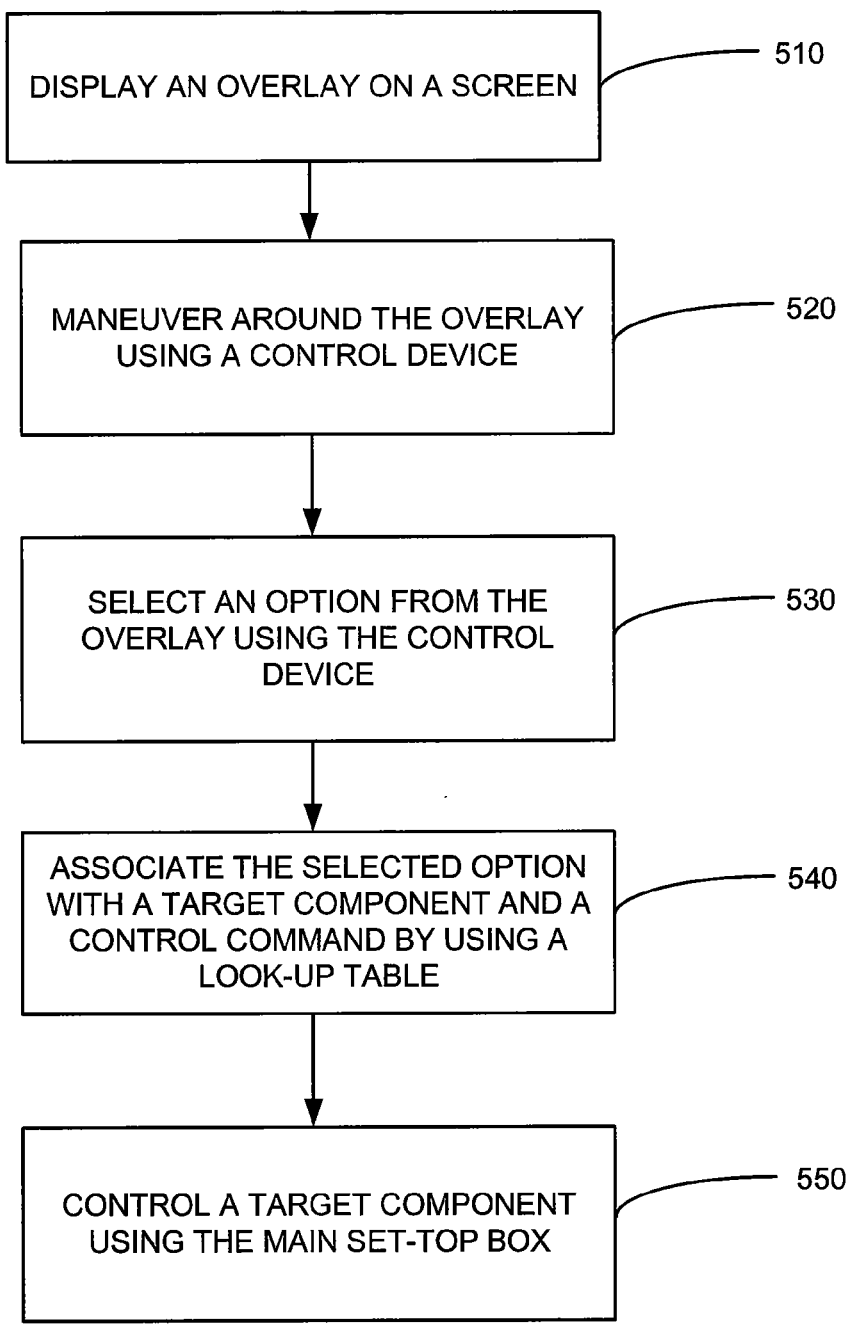
FIG. 5 is a flowchart depicting a method for displaying an overlay that may be controlled from various devices.

FIG. 5 is a flowchart depicting operations of an embodiment of method 500 for controlling one or multiple components through a virtual device. The operation of block 510 may display an overlay on a screen. The overlay may be a virtual remote that provides various selections that a user may choose from when the virtual remote is displayed on a screen of some type. The selections provided by the virtual remote may be virtual buttons, as previously discussed, such that the virtual buttons correspond to a command to operate a component. For example, a first virtual button may be associated with turning the lights on or may be associated with turning the stereo on. Further, selecting a virtual button may initiate a command to operate multiple components. To illustrate, a second virtual button provided by the virtual remote may turn on both an audio system and turn on a DVD player when selected by the user. In yet another example, a third virtual button may provide a pause function for one device. Although multiple virtual buttons may provide control functions such as volume, input and so on for one or multiple devices, each virtual button may control one function for one component.

The information for displaying the virtual device may be downloaded on one set-top box. Additionally, the information such as the look-up table that associates each of the virtual buttons with the corresponding infrared command may also be included on one set-top box. The look-up table may be an ordered list, non ordered list, associative array and so on. The set-top box may transmit the information to other devices when the information is requested. Further, the set-top box may transmit the information to the control device when the target component is not in the line of sight of the set-top box. Thus, multiple set-top boxes may be utilized and dedicated to each of the components that the user wants to control, or additionally, only one set-top box may be utilized to control multiple components.

In the operation of block 520, a control device may be utilized to select any of the available options that appear on the virtual remote on the screen. In one embodiment, a cursor may be used to select an option. In another embodiment a sequential stepping through may be used to select an option. The control device may be any type of device that has the capability to guide a selection mechanism around the screen in any number of directions, including up, down, left and right. In one embodiment of the operation of block 520, a user may control any component that may be controlled by a remote control through either a wired or a wireless connection, via the virtual remote. The virtual remote may be viewed by a user located anywhere in the world. For example, with an appropriate display device and connection to an appropriate network or other signal transmission medium, the virtual remote may be viewed in any number of places. Additionally, the user may control any component that may be included in the selections of the virtual remote. The information for displaying the virtual remote may be provided by one set-top box. In one example, the virtual remote may be viewed via a virtualization of the display output from the set-top box using a computing system that may employ place shifting software such as Sony's LocationFree™, Sling Media's Sling Player™ and so on.

In the operation of block 530, an option may be selected using the control device. A user may scroll around the virtual remote displayed on the screen and may select the desired option using the control device. In one example, the desired option may be highlighted initially, thus the user may select without scrolling around the options provided by the virtual remote. The virtual button selected by the user may be highlighted, backlit or appear distinct from the other buttons so the user may know which virtual button has been selected. Further, a button may have a distinct appearance before the user selects the button, to allow the user a reference point in the options such that the user may determine which option will be selected upon pushing the select button on the control device. The option may be selected by the user via a select button on the control device. The select button may not be a physical button, as the user may use a touch pad on a computing system to make the selection, thus requiring the user to tap the touch pad when making the selection from the virtual remote. Additionally, the operations of 520 and 530 may be performed in any order.

In the operation of block 540, the set-top box may associate the selected option with a target component. Further, the set-top box may employ a look-up table to find the target component and control functionality that corresponds with the selected option. In the operation of block 550, the set-top box may control a target component corresponding to the option selected on the virtual remote. The set-top box may receive the selected option either wirelessly or through a wired connection such as an IP connection where the selected option may correspond to a control function for a target component. The set-top box may control the target component by sending radio frequency or infrared signals to the target component. In one embodiment, the control device may be located in the line of sight of the target component and the set-top box may send a radio frequency signal to the control device. The radio frequency signal received by the control device may include information for communicating with the target component. The control device may then communicate with the target component corresponding to the selected option on the virtual remote. Although the control device may communicate with the target component, the set-top box may effectively control the target component.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

The invention claimed is:

1. A method, comprising:
   downloading, by a set-top box, control data for a plurality of electronic devices from a plurality of control data providers;
   storing, by the set-top box, the control data in a memory of the set-top box;
   displaying a plurality of selectable options in a virtual device on a display that is coupled to the set-top box, the plurality of selectable options being associated with the plurality of electronic devices;
   receiving, by the set-top box, a first command from a set-top box control device, the first command selecting an option of the plurality of selectable options, the selected option being associated with a target electronic device of the plurality of electronic devices;
   determining, by the set-top box, target control data of the stored control data, the target control data corresponding to the target electronic device; and
   transmitting, by the set-top box, a second command to the target electronic device, the second command including the target control data.

2. The method of claim 1, wherein the second command is transmitted to the target electronic device wirelessly.

3. The method of claim 1, wherein the target electronic device is a first target electronic device and the second command includes a first instruction and a second instruction, the first instruction activates a function of the target electronic device, the second instruction activates a function of a second target electronic device.

4. The method of claim 1, further comprising obtaining, by the set-top box, the control data from a storage device.

5. The method of claim 1, further comprising displaying the plurality of selectable options in the virtual device on a display that is located at a remote location from the set-top box, the virtual device being provided by the set-top box.

6. The method of claim 1, wherein the plurality of control data providers include the plurality of electronic devices and a plurality of control devices, the plurality of control devices being configured to control the plurality of electronic devices, respectively.

7. A method, comprising:
   receiving, by an electronic device, an input command;
   determining, by the electronic device, a component of a plurality of components that is associated with the input command;

switching, by the electronic device, the electronic device to a first control mode, the electronic device being configured to control the determined component in the first control mode;

transmitting, by the electronic device, a first control command to the determined component in response to the switching of the electronic device to the first control mode, the first control command turning the determined component on;

transmitting, by the electronic device, a second control command to the determined component in response to the transmitting of the first control command, the second control command configuring the determined component to receive a satellite signal from a satellite receiver; and switching, by the electronic device, the electronic device to a second control mode in response to the transmitting of the second control command, the electronic device being configured to control the satellite receiver in the second control mode.

8. The method of claim 7, wherein the electronic device is a set-top box and the determined component is a television.

9. The method of claim 7, further comprising obtaining, by the electronic device, control data for the plurality of components from a storage device, the first and second control commands utilizing the control data.

10. The method of claim 7, wherein the second control mode is a default control mode.

11. The method of claim 7, wherein the second control command includes changing a channel of the determined component.

12. The method of claim 7, further comprising obtaining, by the electronic device, control data for the plurality of components from multiple devices of a plurality of devices, the plurality of devices including the plurality of components and a plurality of control devices, the plurality of control devices being configured to control the plurality of components, respectively, the first and second control commands utilizing the control data.

* * * * *

UNITED STATES PATENT AND TRADEMARK OFFICE
CERTIFICATE OF CORRECTION

| | |
|---|---|
| PATENT NO. | : 9,800,837 B2 |
| APPLICATION NO. | : 12/347722 |
| DATED | : October 24, 2017 |
| INVENTOR(S) | : John T. Kennedy et al. |

It is certified that error appears in the above-identified patent and that said Letters Patent is hereby corrected as shown below:

On the Title Page

Item (57), Line 5-6 of the Abstract:
"around the virtual device and make a selection fro the options provided" should read, --around the virtual device and make a selection from the options provided--.

Signed and Sealed this
Twenty-second Day of May, 2018

Andrei Iancu
*Director of the United States Patent and Trademark Office*

UNITED STATES PATENT AND TRADEMARK OFFICE
CERTIFICATE OF CORRECTION

PATENT NO. : 9,800,837 B2  
APPLICATION NO. : 12/347722  
DATED : October 24, 2017  
INVENTOR(S) : Kennedy et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1643 days.

Signed and Sealed this  
Tenth Day of January, 2023

Katherine Kelly Vidal  
*Director of the United States Patent and Trademark Office*